Figure 1:
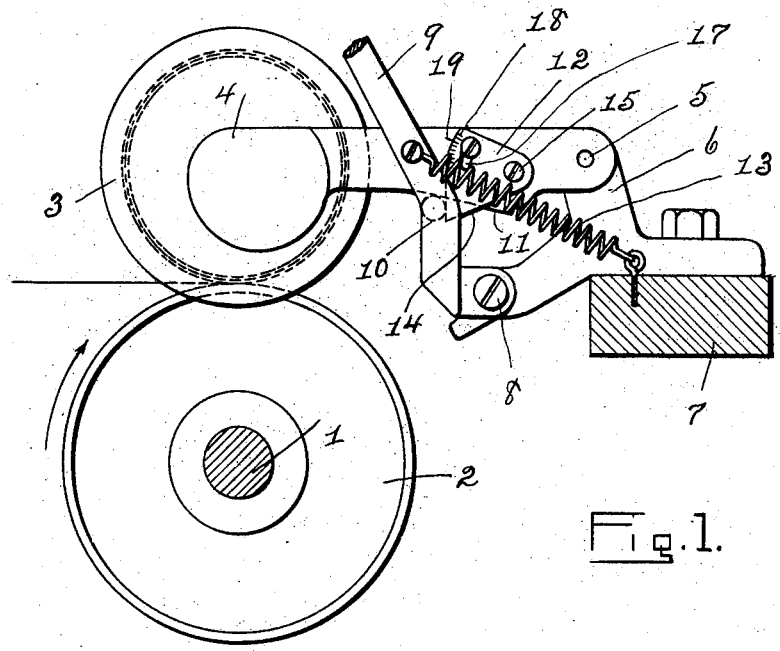

W. T. BALDWIN.
SPOOL CUT-OUT FOR SPOOLING MACHINES.
APPLICATION FILED NOV. 24, 1911.

1,025,558.

Patented May 7, 1912.

WITNESSES:
B. A. Leduc.
J. E. Donsbach.

INVENTOR:
William T. Baldwin,
BY Frank C. Curtis,
ATTORNEY.

UNITED STATES PATENT OFFICE.

WILLIAM T. BALDWIN, OF TROY, NEW YORK, ASSIGNOR TO THE ATWOOD MACHINE CO., OF STONINGTON, CONNECTICUT, A CORPORATION OF NEW JERSEY.

SPOOL CUT-OUT FOR SPOOLING-MACHINES.

1,025,558.             Specification of Letters Patent.         Patented May 7, 1912.

Application filed November 24, 1911. Serial No. 662,149.

*To all whom it may concern:*

Be it known that I, WILLIAM T. BALDWIN, a citizen of the United States, residing at Troy, county of Rensselaer, and State of New York, have invented certain new and useful Improvements in Spool Cut-Outs for Spooling-Machines, of which the following is a specification.

The invention relates to such improvements and consists of the novel construction and combination of parts hereinafter described and subsequently claimed.

Reference may be had to the accompanying drawings, and the reference characters marked thereon, which form a part of this specification. Similar characters refer to similar parts in the several figures therein.

Figure 2:
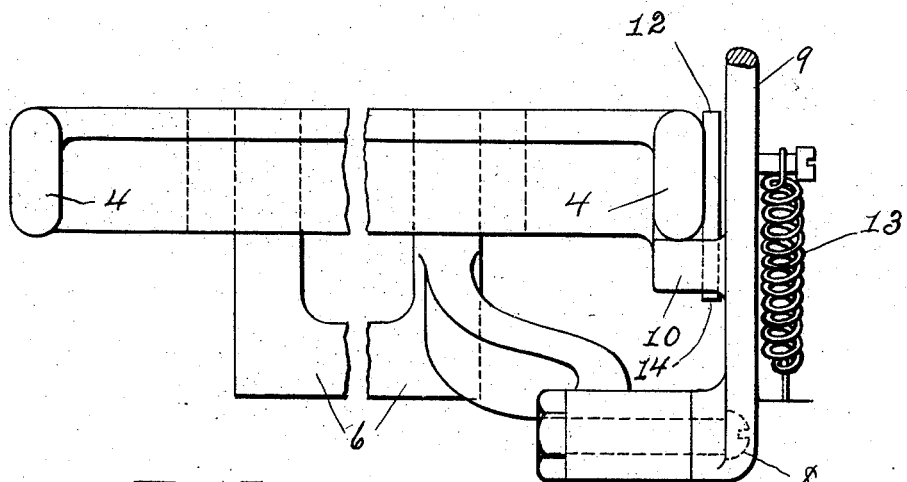

Figure 1 of the drawings is a view in side elevation of a spool-winding mechanism provided with my improved automatic spool cut-out, showing the partly filled spool in contact with a friction-wheel fixed upon a drive-shaft which is shown in cross-section. Fig. 2 is a view in front elevation of the same.

This invention relates to machines for winding thread or yarn from hanks onto spools by means of a friction-wheel, in contact with which the partly filled spool is supported by means of a movable spool-holder.

The principal object of the invention is to utilize the movement of the spool-holder due to the accumulation of thread upon the spool to automatically remove the filled spool from contact with the driving friction-wheel to prevent overloading of the spool.

Other objects will appear in connection with the following description.

Referring to the drawings wherein the invention is shown in preferred form, 1, is the drive-shaft, and, 2, is a friction-wheel fixed thereon adapted to engage the partly filled spool, 3, rotatively supported by a spool-holder 4. The spool-holder, 4, which is in the form of a yoke is pivoted at, 5, upon a bracket, 6, bolted to the frame, 7, of the machine, whereby the spool-holder is adapted to oscillate vertically to move the spool toward and from the friction-wheel 2.

Pivoted at, 8, upon the lower end of the bracket, 6, is a cut-out lever, 9, carrying a pin, 10, adapted to engage a cam-surface or incline, 11, on the underside of the spool-holder to raise the spool-holder sufficiently to lift the spool out of contact with the friction-wheel, 2, and thereby to cut out the spool from further operation. Fixed upon the spool-holder, 4, is a stop-plate, 12, which normally projects into the path of the pin, 10, to prevent the same from being swung into contact with the cam-surface, 11, on the spool-holder. A coil-spring, 13, connected with the cut-out lever, 9, tends to hold the pin, 10, against the stop-plate, 12, until said stop-plate is raised out of the path of said pin, and then to force said pin, 10, against the cam-surface, 11, on the spool-holder to further raise the spool-holder and support the same in raised position.

The friction-wheel, 2, engages the partly filled spool, that is, such body of thread as has been wound upon the spool; and, as the filling of the spool continues, the enlarging diameter of the body of thread thereon will gradually raise the spool-holder. The stop-plate, 12, will thus be gradually carried upward by the spool-holder until it is withdrawn from the path of the pin, 10, just as the filling of the spool is completed to the desired degree. As soon as the stop-plate, 12, has been raised out of the path of the pin, 10, the spring, 13, automatically moves the cut-out lever, 9, to force the pin, 10, against the cam-surface, 11, thereby further raising the spool-holder sufficiently to elevate the filled spool out of engagement with the friction wheel, 2, thereby cutting out the spool from the operation of the machine, as indicated by dotted lines in Fig. 1. The operator thereupon removes the filled spool, replaces it with an empty spool, winds the end of the thread sufficiently upon the new spool to be properly engaged by the friction-wheel, 2, and then sets the cut-out mechanism by forcing the cut-out lever, 9, forward past the stop-plate, 12, until the holder and spool drop into operative position.

To facilitate setting the cut-out mechanism, the rear edge of the cut-out plate, 12, is inclined or beveled as shown at 14.

I have shown a spring, 13, for automatically operating the cut-out lever, 9, when released by the stop-plate, 12, but said lever may be caused to thus operate automatically in any known manner.

To adapt the device for filling the spools to a greater or less degree as desired, or to the filling of spools of different diameters, I have shown the plate, 12, vertically adjustable, said plate being pivotally mounted upon the spool-holder at, 15, and adapted to be locked in the desired adjusted position by means of a screw, 16, passing through a slot, 17, in said plate.

If desired, the edge of the plate may be provided with a graduated scale, 18, adapted to be read in connection with an index, 19, on the spool-holder to guide the operator in adjusting the plate 12.

What I claim as new and desire to secure by Letters Patent is—

1. In a spool-winding mechanism, and in combination, a friction drive-wheel; a spool-holder movable toward and from said wheel, and adapted to support a partly filled spool in contact therewith; a cut-out lever automatically movable when released, and having a projection adapted by the automatic movement of the lever to engage and raise said spool-holder; and a stop-plate carried by said spool-holder, and vertically adjustable thereupon, said stop-plate projecting normally into the path of said projection, and adapted to be raised above said path by the accumulation of thread upon said spool.

2. In a spool-winding mechanism, and in combination, a friction drive-wheel; a pivotally mounted spool-holder oscillatory vertically toward and from said wheel, and adapted to support a partly filled spool in contact therewith; a cut-out lever having a projection; a spring connected with said lever tending to cause said projection to engage and raise said spool-holder; and a stop-plate carried by said spool-holder, and vertically adjustable thereupon, said stop-plate projecting normally into the path of said projection, and adapted to be raised above said path by the accumulation of thread upon said spool.

3. In a spool-winding mechanism, and in combination, a friction drive-wheel; a spool-holder movable toward and from said wheel, and adapted to support a partly filled spool in contact therewith; a cut-out lever automatically movable when released, and having a projection adapted by the automatic movement of the lever to engage and raise said spool-holder; and a stop on the spool-holder normally in the path of said projection, and adapted to be raised above said path by the accumulation of thread upon said spool, said stop having an inclined rear edge adapted to yieldingly permit the passage of said projection when the cut-out lever is moved forward.

In testimony whereof, I have hereunto set my hand this 16th day of November, 1911.

WILLIAM T. BALDWIN.

Witnesses:
 JOHN T. HURLEY,
 THOMAS TYNAN.

---

Copies of this patent may be obtained for five cents each, by addressing the "Commissioner of Patents, Washington, D. C."